United States Patent
Maurer et al.

(10) Patent No.: US 8,473,425 B1
(45) Date of Patent: Jun. 25, 2013

(54) PREDICTIVE DROP SHIPPING

(75) Inventors: Jeffrey B. Maurer, Issaquah, WA (US); Jason W. Murray, Bellevue, WA (US); Eric Mack, Seattle, WA (US); Devesh Mishra, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 78 days.

(21) Appl. No.: 13/164,559

(22) Filed: Jun. 20, 2011

(51) Int. Cl.
*G06Q 30/00* (2012.01)

(52) U.S. Cl.
USPC ........ 705/336; 705/338; 705/341; 705/14.45; 705/14.42

(58) Field of Classification Search
USPC .................... 705/336, 338, 341, 14.42, 14.45
See application file for complete search history.

(56) References Cited

U.S. PATENT DOCUMENTS

| | | | |
|---|---|---|---|
| 2002/0042755 A1* | 4/2002 | Kumar et al. ................ | 705/26 |
| 2002/0138358 A1* | 9/2002 | Scheer ........................ | 705/26 |
| 2003/0036938 A1* | 2/2003 | Dutta et al. ................. | 705/8 |
| 2003/0093388 A1* | 5/2003 | Albright ..................... | 705/400 |
| 2006/0271671 A1* | 11/2006 | Hansen ....................... | 709/224 |
| 2007/0124192 A1* | 5/2007 | Moatti ........................ | 705/10 |
| 2007/0130090 A1* | 6/2007 | Staib et al. ................. | 705/400 |
| 2008/0189156 A1* | 8/2008 | Voda et al. ................. | 705/7 |
| 2011/0071897 A1* | 3/2011 | Kniaz et al. ............... | 705/14.42 |

* cited by examiner

*Primary Examiner* — Kevin Flynn
(74) *Attorney, Agent, or Firm* — Robert C. Kowert; Meyertons, Hood, Kivlin, Kowert & Goetzel, P.C.

(57) ABSTRACT

Systems and methods for predictive drop shipping are disclosed. In some embodiments, a method may include maintaining inventory of an item that is offered for sale to customers via a webpage. A ratio may be calculated between a number of views of the webpage and a number of units of the item purchased over a first time period when a fast shipping or delivery option is available, and over a second time period when such option is not available. The method may identify the item as a candidate for drop shipping in response to the ratio being larger during the first time period than during the second time period. Upon receipt of an order, the received order may be fulfilled via drop shipping, in some cases, despite the inventory being sufficient to fulfill the order, and despite a cost of fulfillment via drop shipping being higher than fulfillment from inventory.

11 Claims, 10 Drawing Sheets

PREDICTIVE DROP SHIPPING

BACKGROUND

To provide a wide selection of products that are readily available for delivery, many merchants (whether engaging in electronic or conventional "brick and mortar" commerce) may store those products in warehouses, fulfillment centers, or other inventory facilities. Keeping items in inventory may provide numerous benefits, such as, for example, accommodating variations in customer demand and/or a manufacturer or distributor's ability to supply those items. Typically, holding some quantities of a particular product "in stock" may enable a merchant to make such product available to customers in a more consistent fashion.

However, to maintain products in stock, a merchant incurs certain costs. Some of these costs may include, for example, real estate costs (e.g., lease costs, debt service, etc.), personnel costs, and facilities costs (e.g., utilities, maintenance, etc.). There may also be capital or economic costs related to the money that a merchant paid its vendor to obtain a stored product, which is then committed to inventory until payment for that product is received from a customer. Other types of costs may further include loss or damage due to accidents, or the like.

As an alternative to maintaining stock, a merchant may sometimes employ a "drop shipping" technique. Generally speaking, drop shipping involves transferring a customer's order to the manufacturer (or other third party, e.g., vendor, supplier, wholesaler, distributor, retailer, etc.), which then ships the ordered item directly to the customer. Drop shipping may, in some cases, allow the merchant to avoid the costs associated with stocking items in its own inventory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for predictive drop shipping are disclosed. In some embodiments, systems and methods described herein may allow a merchant to identify an item as a candidate for drop shipping fulfillment. Upon receipt of an order for that item, the merchant may fulfill the order with drop shipping. In some cases, the order may be fulfilled via drop shipping despite the merchant's own inventory being otherwise sufficient to fulfill the received order. Moreover, the merchant may fulfill the order via drop shipping despite a cost of fulfillment through drop shipping being higher than a cost of fulfillment from inventory.

According to some embodiments, a method may include maintaining a record of an inventory of an item, where the item is offered for sale to customers via a web page. The method may also include calculating a ratio between a number of views of the web page and a number of units of the item purchased over a first time period when a fast shipping or delivery option is available and over a second time period when the fast shipping or delivery option is not available. In some cases, the method may include identifying the item as a candidate for drop shipping fulfillment in response to the ratio being larger during the first time period than during the second time period. Then, in response to receiving an order for the item, the method may include fulfilling the received order with drop shipping, where the inventory is sufficient to fulfill the received order, and where a cost of fulfillment through drop shipping is higher than a cost of fulfillment from the inventory.

According to other embodiments, a computer-readable storage medium may have instructions stored thereon that, upon execution by one or more computer systems, cause the one or more computer systems to calculate an expected cost associated with being unable to provide a customer with a fast shipping or delivery option for an item. The instructions may also cause the one or more computer systems to calculate cost of drop shipping the item. The instructions may further cause the one or more computer system to identify the item as a candidate for drop shipping fulfillment in response to the expected cost being larger than the cost of drop shipping.

According to yet other embodiments, a system may include at least one processor and a memory coupled to the at least one processor, where the memory stores program instructions, and wherein the program instructions are executable by the at least one processor to calculate conversion rate for a product offered for sale by a merchant over a first period when a fast shipping or delivery option is available and over a second period when the fast shipping or delivery option is not available. The instructions may be further executable by the at least one processor to identify the product as a candidate for fulfillment by a third party in response to the conversion rate being larger over the first period than over the second period.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person.

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility such as, for example, warehouses, repositories, depositories, stockrooms, storehouses, distribution centers, material handling facilities, or the like.

As used herein, the term "drop shipping" includes techniques whereby a merchant, upon receipt of an order for an item from a customer, transfer that order (and/or fulfillment or shipment information related to the order) to a third-party or "drop-shipper." The drop shipper then ships the ordered item directly to the merchant's customer. In general, the drop shipper may be any entity, other than the merchant, from which items may be shipped. For example, in some cases, the drop shipper may be a manufacturer, supplier, vendor, wholesaler, retailer, or middle man.

Figure 1:
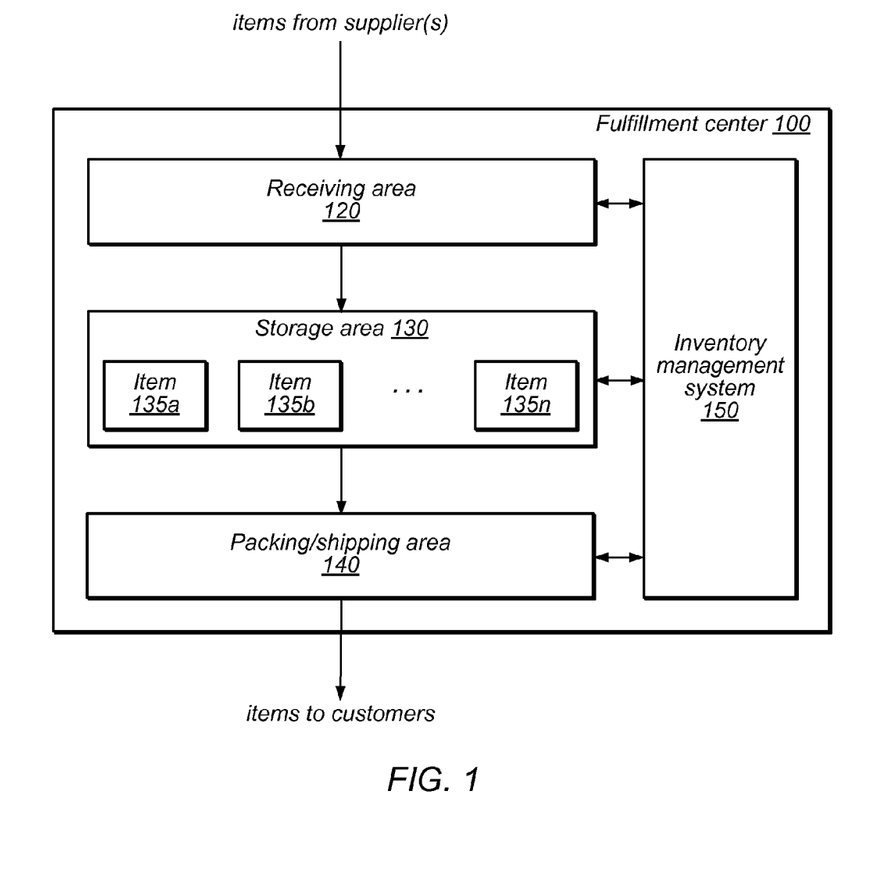
FIG. 1 is a block diagram of a fulfillment center according to some embodiments.

In order to offer its customers a wider variety of items that are readily available for delivery, a merchant may store various quantities of such items within one or more fulfillment centers. An embodiment of one such fulfillment center is shown in FIG. 1. As illustrated, fulfillment center 100 includes receiving area 120, storage area 130 configured to store an arbitrary number of items or products 135a-n, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for shipment to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 100 often presents complex optimization issues. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

A merchant that deals with customers on a large scale may not adequately meet its business goals with only a single fulfillment center 100. For example, a merchant that deals in many different types of items 135 and/or that services customers in a large geographical region may find it impractical to keep its entire inventory in one facility. In some instances, a merchant that faces the challenge of scaling its inventory and fulfillment handling capabilities may choose to deploy a more complex fulfillment network. To address these challenges, the merchant may implement an order fulfillment and inventory planning system or the like.

In some cases, an order fulfillment and inventory planning system may implement a "drop shipping" fulfillment channel for certain items. As previously noted, drop shipping involves transferring a customer's order for an item to the item's manufacturer or to a third party, which then ships the item directly to the customer. Drop shipping may, in some cases, allow the merchant to avoid having to stock certain items in its own inventory. Traditionally, a merchant would choose to drop ship an item if the merchant did not stock the item as part of its regular operations or if, despite usually having the item in inventory, the merchant had temporarily run out-of-stock of such item (e.g., it has sold out of units of the item that are on hand in the merchant's fulfillment network). In contrast with this approach, certain techniques described herein may allow a merchant to identify certain items for which is may be more advantageous to provide drop ship fulfillment despite the merchant having the items in inventory and/or despite the cost of drop shipping being higher than the cost of fulfillment from inventory.

Figure 2:
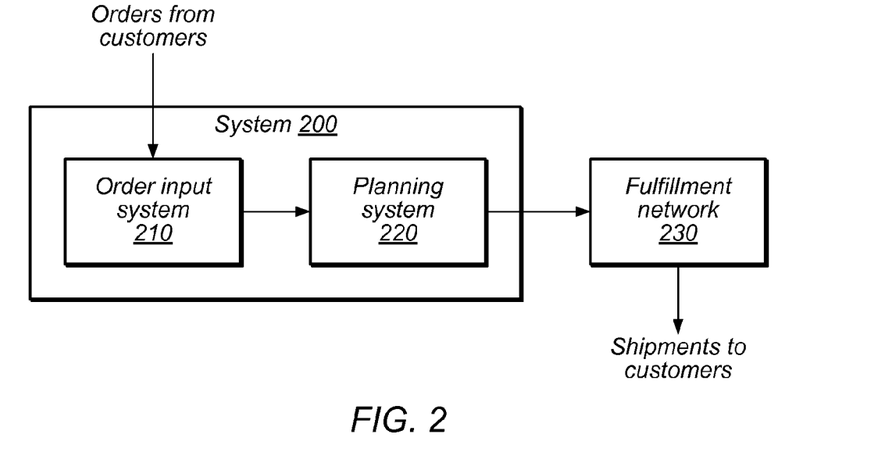
FIG. 2 is a block diagram of a system configured to receive customer orders and perform fulfillment and inventory planning according to some embodiments.

FIG. 2 illustrates an embodiment of a system configured to receive customer orders and perform fulfillment and inventory planning according to some embodiments. Specifically, system 200 may be configured to receive customer orders for items 135, determine how customer orders should be assigned to the resources of network 230 for fulfillment, and dispatch instructions to the assigned resources of network 230 in order to effect shipment of customer orders. In addition, system 200 may also be configured to determine set inventory targets for items stored in a fulfillment center in such a way that those targets increase (or maximize) the number of fast-delivery offers that may be made to expected customers. In some embodiments, system 200 may also determine whether to store such items in the fulfillment center. To this end, system 200 may implement an optimization formulation whose solution maximizes the expected value of fast-delivery offers presented to customers in a given region. In the illustrated embodiment, system 200 includes an order input system 210 that is configured to communicate with a fulfillment and inventory planning system 220, which is in turn configured to communicate with network 230.

Generally speaking, order input system 210 may be configured to receive orders placed by customers for various items 135 offered by the merchant. In some embodiments, order input system 210 may be configured to implement an electronic commerce (e-commerce) portal or website, such as a web-based interface through which customers may browse items 135, select items 135 for ordering, and supply details regarding orders (e.g., payment information, shipping address information, etc.). In other embodiments, order input system 210 may be configured to implement an order entry interface that is not presented to the customer directly, but which is instead employed by an agent (e.g., a salesperson, customer service representative, etc.) to input order information on behalf of a customer.

Planning system 220 may generally be configured to receive incoming orders received by the merchant via order input system 210 and to analyze customer orders to determine how they should be assigned to various fulfillment centers of network 230 for fulfillment, or whether the customer orders (or portions of the orders) should be fulfilled via drop shipping. For example, if a given customer orders five distinct items 135, it may be possible to ship all of the ordered items 135 from a single fulfillment center 100. However, it may also be possible to divide the given customer's order for fulfillment by multiple different fulfillment centers 100. Moreover, in some cases one or more of the order items 135 may not be in stock in any of fulfillment centers 100. As discussed below, numerous different variables and constraints may be taken into account by planning system 220 when generating a fulfillment plan for an order, such as the costs associated with various plans, the promises made to the customer regarding shipping or arrival dates, or other factors.

After identifying the fulfillment plan that should be executed for a particular order, fulfillment and inventory planning system 220 may be configured to communicate instructions to network 230 in order to realize the plan. In some cases, fulfillment network 230 may include a set of fulfillment centers 100 similar to those illustrated in FIG. 1, which operate under the control of the merchant. In addition, fulfillment network 230 may include one or more third-party "drop shippers" that, while capable of fulfilling the merchant's customer orders, are distinct entities not under control of the merchant.

For example, in some cases fulfillment and inventory planning system 220 may interact with the inventory management system 150 of a fulfillment center 100 corresponding to a particular fulfillment center to instruct that certain items 135 of a particular order should be picked, packed, and shipped to the customer for the particular order. Additionally or alternatively, planning system 220 may interact with a drop shipper, such as a third-party merchant, manufacturer, or distributor, to instruct that certain items 135 of a particular order should be shipped directly to the customer (e.g., without being first stored in one of the merchant's fulfillment centers 100 or otherwise received by the merchant). In various embodiments, communication of fulfillment instructions that are needed to implement a particular fulfillment plan to the various fulfillment centers 100 and/or drop shippers within network 230 may occur according to any suitable technique. For example, planning system 220 may be configured to exchange messages with systems within a particular fulfillment center or drop shipper using web-based protocols (e.g., Hypertext Transfer Protocol (HTTP), eXtensible Markup Language (XML), or other suitable protocols) conveyed via the public Internet, a private intranet, Virtual Private Networks, or another suitable networking scheme or combination of these. Communication between planning system 220 and/or fulfillment centers and/or drop shippers may also be implemented using electronic mail or other messaging techniques, analog or digital telephony, or any other wired or wireless data transfer technique, either using standard or proprietary protocols.

Still referring to FIG. 2, a customer may place one or more orders with the merchant for one or more units of one or more items. For simplicity of explanation, however, let us consider a situation where the customer places one order for one unit of one item. As previously noted, the order may be placed online (i.e., with a computer device connected to the Internet), via a mail-in form, via a telephone, in-person, or in any other suitable manner. In the case of an online order, that order may be received, for example, by order input system 210. The customer may select the item for purchase and add it to a virtual "shopping cart." During a "checkout" procedure, the customer may provide billing and/or shipping address information to the merchant, as well as specify shipping/delivery options for the item, such as, for example, same-day delivery, next-day delivery, two-day delivery, 3-5 business days, 5-8 business days, etc. In addition, the customer may also request that additional services be provided such as, for example, gift wrapping, inspections, functional testing, etc.

During the "checkout" phase or process, the merchant may determine whether certain types of delivery are available for the item, and may therefore be offered to the customer. For example, very large appliances (even if presently in-stock) or custom-made products may not be available for delivery any sooner than 5-8 business days. On the other hands, tickets to a sports event that will take place in 2 days would need to be delivered in less than 5-8 business days. Accordingly, in some embodiments, the checkout process may only make available to the customer the delivery options that can actually be fulfilled. For example, in the case of a custom-made product, same-day delivery may not be displayed to the customer. On the other hand, in sports event example, only same-day and/or next-day delivery may be offered.

Once the order is completed, the merchant may have an opportunity to make decisions as to how to fulfill the order. In some cases, for example, planning system 220 may be configured to assign particular orders (or portions thereof) to drop shippers. In some cases, if planning system 220 determines that it is at risk of running out-of-stock of a given item and the item has a drop ship option, planning system 220 may use the drop ship option as instantaneously available supply. In this manner, by determining that the order be fulfilled by a drop shipper instead of fulfillment centers 100, planning system 220 may in effect reserve the merchant's own inventory for "fast track" or "high-priority" orders (i.e., orders that select a fast delivery and/or shipping option).

In some embodiments, a fast track or high-priority order may include an order that should generally be fulfilled from a merchant's own inventory. For example, if a customer requests "same-day" delivery for a given item, his or her order may be considered a fast track order if it is determined that, in order to satisfy the customer's delivery request, the item would have to ship quickly from the merchant's own inventory. Other examples of fast track orders may include orders that select next-day delivery, two-day delivery, or the like. In other embodiments, a fast track or high-priority order may include any order that places any type of restriction that would typically require fulfillment by the merchant to the exclusion of a drop shipper or some other third-party. For example, if the customer's order requests that a particular item be gift wrapped, personalized, inspected by the merchant prior to shipping, etc., such an order may also be considered a fast track or high-priority order to the extent that a drop shipper may not typically be capable of fulfilling it as expected.

For sake of illustration, consider the following hypothetical scenario that is provided as another non-limiting example. A merchant may have one unit of a particular item in stock in one of its fulfillment centers 100. Planning system 220 may receive a first order for the item that selects "ground shipping" (e.g., delivery is expected in 5-7 business days). If planning system 220 fulfills that order from its own inventory, it will cause the merchant to run out-of-stock of that item (at least temporarily). Accordingly, subsequent orders for that item would have to be fulfilled by a drop shipper (assuming such an option is available) or not at all. If another customer placed a subsequent order for the out-of-stock item that specified a fast track or high priority option (e.g., it specified a shipping option that cannot be fulfilled by the drop shipper, requested gift-wrapping, etc.), the transaction would not be consummated to the customer's satisfaction, which could result in the return of the item, loss of goodwill, loss of sale, etc.

Hence, to the extent that the merchant is capable of determining that the fast track option is no longer available for that item prior to receiving such subsequent order, the fast track of high priority option may not be presented or displayed to that customer. As a result, the potential subsequent order may not be placed by the customer. For example, if a customer requires that the item be delivered in two-days (or less), but two-day delivery is not an available option, the customer may choose to purchase the item elsewhere.

To avoid these potentially undesirable results, according to some embodiments, planning system 220 may, instead of fulfilling the first order from its own inventory, assign that first order for fulfillment by a drop shipper (assuming, in this hypothetical, that the drop shipper is capable of meeting at least the first order's "ground shipping" requirements). Such a determination may be made despite the merchant's own inventory being otherwise sufficient to fulfill the received order. In addition, this determination may be made despite a cost of fulfillment through drop shipping being higher than a cost of fulfillment from inventory. As such, by assigning the first order to drop shipping fulfillment, planning system 220 may save the merchant's own inventory for the subsequent "fast track" or "high-priority" order. Moreover, in some embodiments, to implement predictive drop shipping fulfillment, planning system 220 may identify one or more items that would be candidates for such operations. These techniques are described in more detail below with respect to FIGS. 3-7.

In various embodiments, order input system 210 and planning system 220 may be implemented as respective dedicated computer systems, or they may be implemented as computer-executable instructions and data that may be executed by one or more computer systems (e.g., as described in greater detail below with respect to FIG. 10). Systems 210 and 220 are discussed and shown as separate systems in order to facilitate their description; however, in some embodiments, the functions of these systems may be integrated into and implemented by a single computer system or set of computer-executable instructions. Alternatively, the functionality of systems 210 and 220 may be partitioned differently than is shown in FIG. 2. For example, some functions of these systems may be assigned to or subsumed within the operation of other systems.

Additionally, it is contemplated that order input system 210 and/or planning system 220 may interact with or implement various features of a number of other features not shown. For example, in one embodiment, order input system 210 may be configured to interact with accounting and billing systems in order to collect customer payments and update enterprise financial records to reflect the effects of transactions. In one embodiment, planning system 220 may be configured to interact with additional systems that track the current state of inventory within network 230 and/or predict its future state (e.g., by predicting lead time for various items 135, accounting for items 135 that are inbound to network 230 but not yet received by fulfillment centers, or analyzing or predicting other network state variables). Planning system 220 may also interact with other systems that model or estimate variables that may influence the planning process, such as the expected transit time for shipping from a particular fulfillment center to a customer via a particular carrier and/or shipping method.

Figure 3:
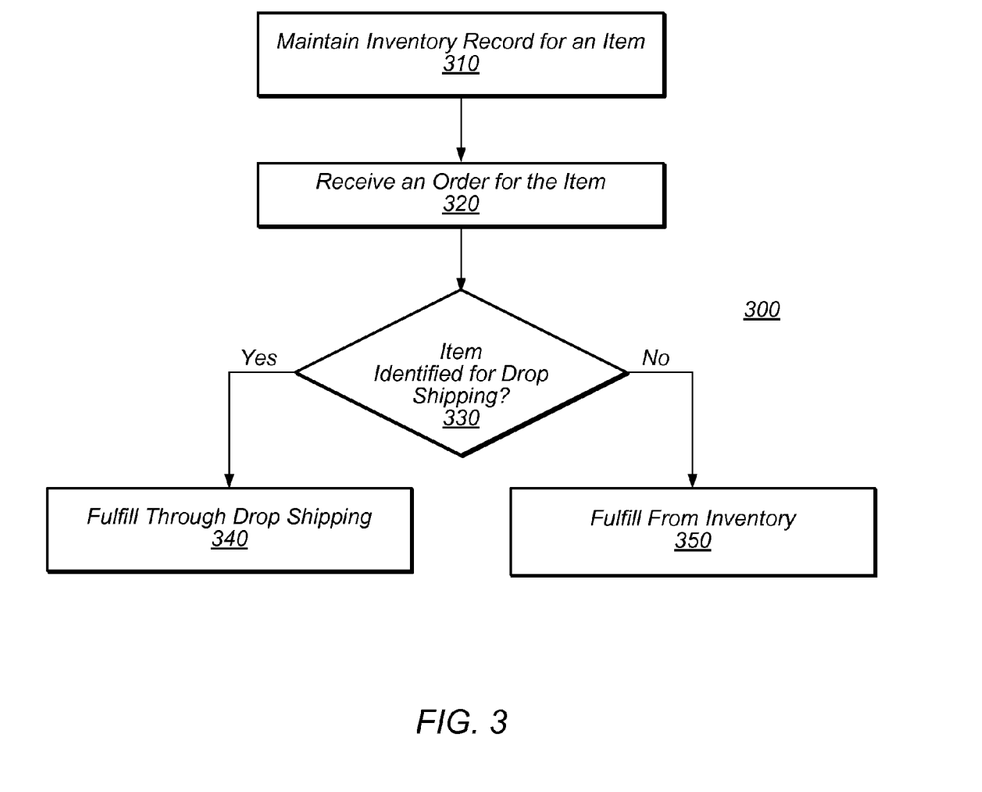
FIG. 3 is a flow diagram of a method for predictive drop shipping according to some embodiments.

Turning now to FIG. 3, a flow chart of a method for predictive drop shipping is depicted according to an embodiment. At block 310, method 300 maintains a record of an inventory of an item. For example, the item may be offered for sale to a merchant's customers via a web page. At block 320, method 300 may determine whether the item has been identified for drop shipping. To that end, block 330 may determine a number of page views of the item during different time periods, calculate conversion ratios, determine costs of running out of stock, etc. as explained in more detail below. In some embodiments, block 330 may determine whether it would be more economically advantageous for the merchant to preserve an item in its own inventory in order to be able to fulfill a fast track order for that item at a later point in time, for example, compared with the cost of drop shipping that item. At block 340, if the item has been identified for drop shipping, planning system 220 may cause the received order to be fulfilled through drop shipping. This may be the case even if the inventory is sufficient to fulfill the received order and despite a cost of fulfillment through drop shipping being higher than a cost of fulfillment from the inventory. Otherwise, at block 350, the received order may be fulfilled from inventory. In some cases, the order of blocks 320 and 330 may be reversed such that an item may be identified for drop shipping before an order for the item is received.

Figure 4:
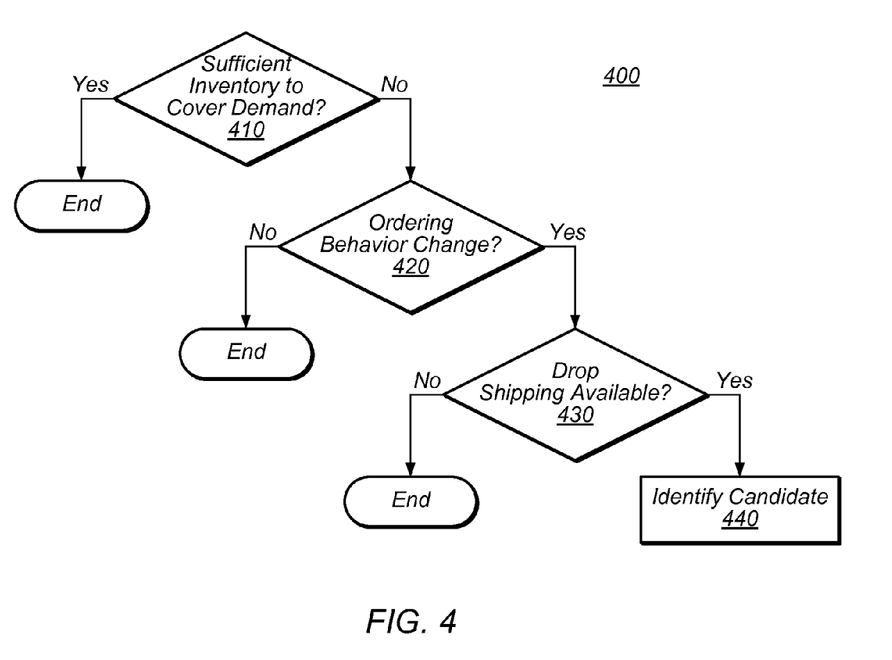
FIG. 4 is a flow diagram of a method for identifying candidates for drop shipping fulfillment according to some embodiments.

FIG. 4 is a flow diagram of a method for identifying candidates for drop shipping fulfillment according to some embodiments. In some cases, method 400 may be implemented by planning system 220 as part of block 330 of FIG. 3. At block 410, method 400 may determine whether the merchant's own inventory is sufficient to cover the expected customer demand for a given item. For example, planning system 220 may receive a demand forecast for the item, and it determine the predicted demand for a particular planning period. In some cases, the demand forecast may be specific to a particular item or it may encompass an expected demand for a group of items bearing some specified relationship to the individual item (e.g., product line, type of item, etc.). Further, the demand forecast may be provided for a particular geographical region (e.g., South, Midwest, etc.), for subsets of regions (e.g., by state), and/or for supersets of regions (e.g., country, continent, etc.).

If block 410 determines that there are insufficient quantities of the item to satisfy the expected demand during the planning period, then block 420 determines whether customer ordering behavior is likely to be affected by lack of a fast track option. These operations are described in more detail with respect to FIG. 5 below. If ordering behavior is determined to change depending upon the availability of fast track options, then block 430 determines whether drop shipping is available for the item. If so, block 440 identifies the item as a candidate for predictive drop shipping. Upon determining that a particular item (or group of items) is a candidate for predictive drop shipping, a list of candidates may be generated. The list of candidate items may then be used to alter the order assignment logic for those items.

Similarly as discussed above with respect to FIG. 3, in some embodiments, the order of blocks 420 and 430 may be reversed. Specifically, in an alternative embodiment, a method may first determine whether drop shipping is available (block 430), and only then determining whether a behavior change has been observed that would favor drop shipping (block 420). Similarly, in other alternative embodiments, blocks 420 and 430 may be performed prior to block 410. In some cases, the operations of blocks 410-430 may be performed prior to receipt of an actual order from a customer. In other cases, the operations of blocks 410-430 may be performed "on-the-fly" (e.g., at a time when planning system 220 determines how to fulfill the received order).

Figure 5:
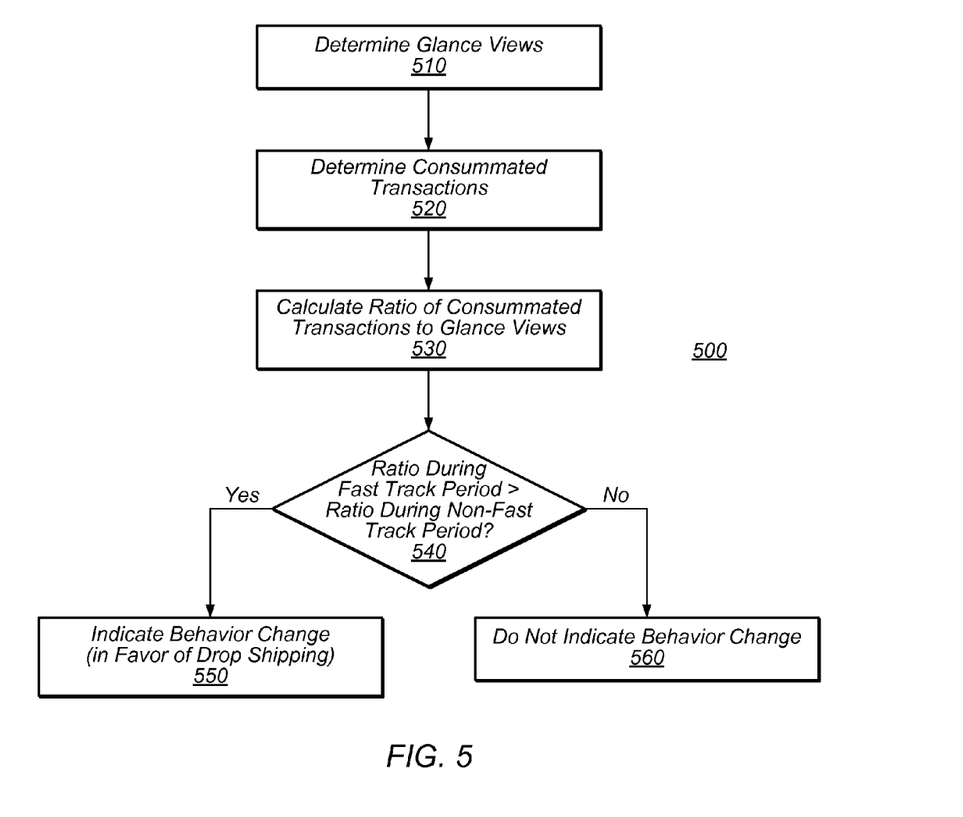
FIG. 5 is a flow diagram of a method for identifying changes in ordering behavior according to some embodiments.

FIG. 5 is a flow diagram of a method for identifying changes in ordering behavior according to some embodiments. In some cases, method 500 may be implemented by planning system 220 to perform the operations described with respect to block 420 of FIG. 4. Generally speaking, method 500 may utilize historical data to determine the likelihood that a customer's ordering behavior will be impacted by the presence or absence of fast track options for an item. At block 510, method 500 may determine a number of "glance views" associated with a particular item. For example, in the case where the merchant maintains a website that includes a given webpage offering that item for sale, block 510 may determine a number of times that the given webpage was viewed by customers. In some embodiments, block 510 may obtain this information from a page counter or the like. At block 520, method 500 may determine a number of consummated transactions for the item—that is, a number of times that the item was actually ordered, typically after customers viewed the item's webpage—or the quantities of the item that were actually ordered.

At block 530, method 500 may calculate a ratio of consummated transactions to glance views, also referred to herein as a "conversion rate." In some embodiments, a ratio or conversion rate may be determined per unit of time (e.g., per hour, per day, per week, etc.). Method 500 may, at block 540, determine how the conversion rate varies over time, which may provide a measure of the customer's instock status elasticity. For example, during a given period of time (e.g., a month, a quarter, etc.), there may be certain periods when a fast track option is made available to customers accessing the item's webpage, and these may be referred to as "fast track" periods. Meanwhile, there may be other periods when the fast track options are unavailable, also referred to as a "non-fast track" periods (e.g., the merchant has run out-of-stock of the item and therefore was unable to fulfill quick delivery requests). If the ratio or conversion rate during the fast track period(s) is not larger than the ratio or conversion rate during the non-fast track period(s), then block 560 may determine that there is no behavior change that would suggest employing of predictive drop shipping for that item. However, if the ratio or conversion rate during the fast track period(s) is larger than the ratio or conversion rate during the non-fast track period(s), then block 550 may determine that the customer behavior favors employing predictive drop shipping for the item.

In some embodiments, identifying an item as a candidate for drop shipping fulfillment may include determining that a difference between the ratio during the first time period and the ratio during the second time period is larger than a threshold. The threshold may be determined, for example as a relative value (e.g., customer ordering behavior suggests employing predictive drop shipping if the conversion rate during FT periods is 25%, 50%, 75%, etc. greater than the conversion rate during NFT periods). In other cases, the threshold may be expressed as an absolute instock status elasticity value (e.g., the elasticity would have to be greater than a fixed, predetermined amount, in order to trigger a predictive drop shipping recommendation for the item).

In an alternative embodiment, rather than calculating conversion ratios, method 500 may simply look at a number of page views for the item. For example, the merchant may make one or more search filters available through its website that allow its customers to search only for products for which fast track options are available (i.e., if an item cannot be "fast tracked," it may not be viewable by a customer). As such, items for which fast shipping or delivery is not available may, in some cases, be accounted for in the total number of page views for a particular item. Moreover, there may be situations where a fast track options are more valuable for certain types of items that others (e.g., personal hygiene products are generally needed faster than electronics). In those cases, the value of an item's webpage view where a fast track option is available may be compared against the cost of drop shipping that item. Generally speaking, when an item has a high fast track value, a merchant may be more willing to pay for the extra cost of drop shipping that item. In other words, in some embodiments the calculated value of a fast track option for a given item may determine the magnitude of the drop shipping cost that would still make drop shipping attractive to the merchant.

Figure 6:
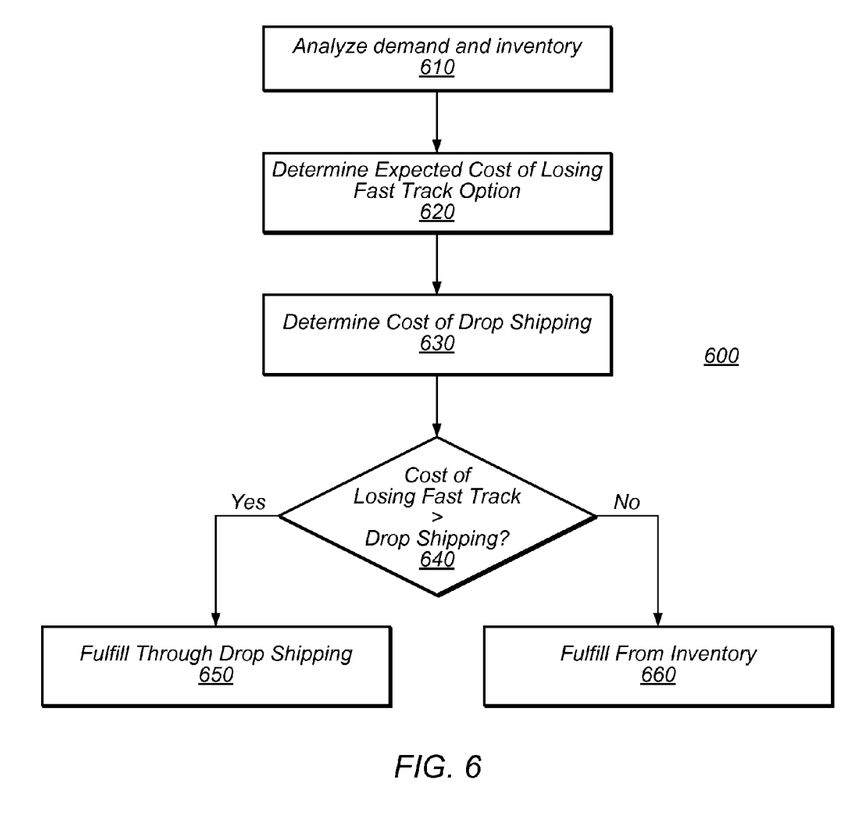
FIG. 6 is a flow chart of a predictive drop shipping cost analysis according to some embodiments.

FIG. 6 is a flow chart of a predictive drop shipping cost analysis according to some embodiments. At block 610, method 600 may analyze expected or forecasted demand for an item, and the available inventory of that item. Block 620 may determine the expected cost of losing a fast track option for the item. For example, if an outstanding order for the item is fulfilled from inventory, at least a portion of the subsequent orders may be not be capable of fulfillment using a fast track option. Block 630 then determines a cost of drop shipping, which in many cases would be higher than the cost of fulfilling from inventory. At block 640, if the cost of losing the fast track option is larger than the cost of drop shipping, block 650 may cause the outstanding order to be fulfilled through drop shipping. Otherwise, block 660 may cause the outstanding order to be fulfilled from inventory.

Figure 7:
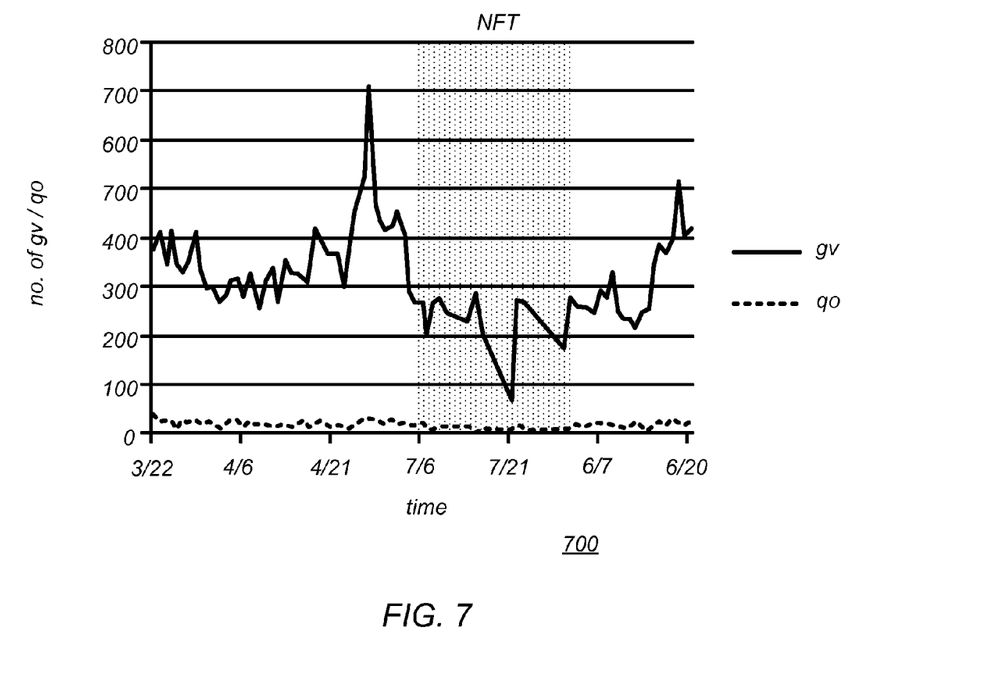
FIGS. 7-9 are graphs illustrating glance views and quantities ordered for various items according to some embodiments.
Figure 8:
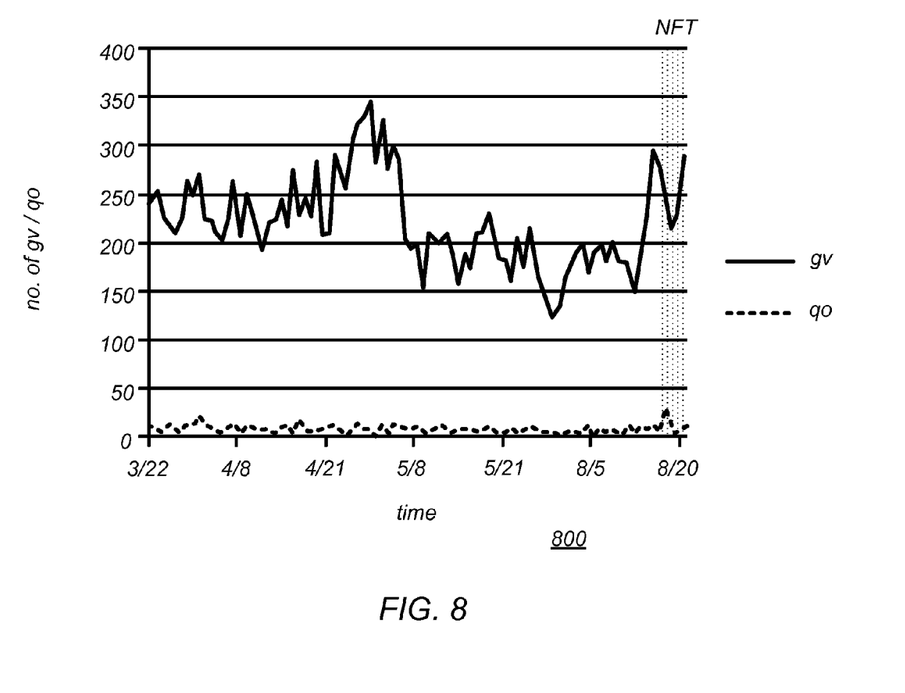
Figure 9:
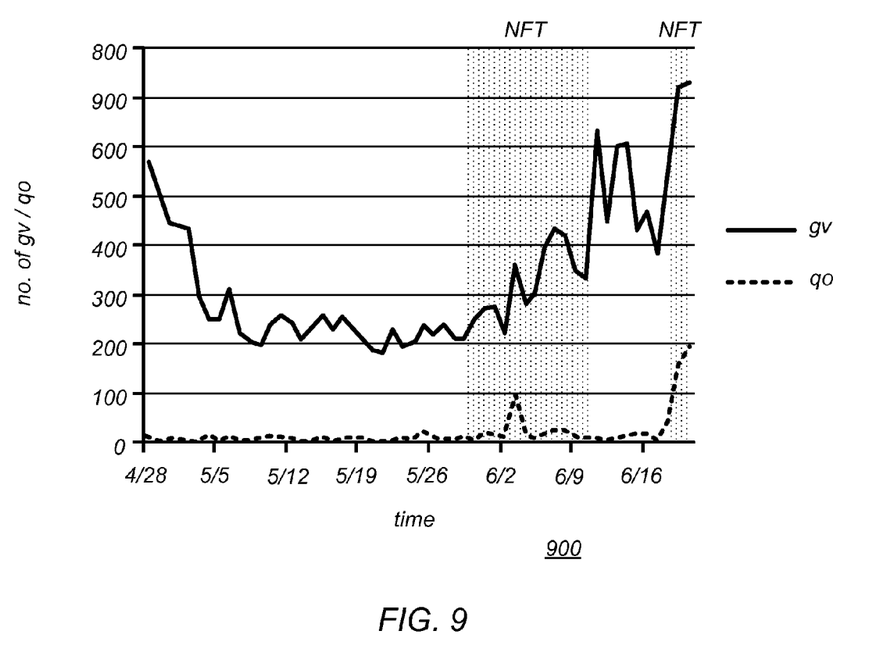

FIGS. 7-9 are graphs illustrating glance views and quantities ordered for various items according to some embodiments. As discussed below, FIG. 7 shows a drop in conversion rates across two different time periods, FIG. 8 shows conversion rates that remain unchanged across two time periods, and FIG. 9 shows conversion rates that increase across two time periods. In FIG. 7, graph 700 shows the number of glance views ("gv" shown as solid lines) and quantities ordered ("qo" shown as dotted lines) for a particular item between the dates of 3/22 and 6/20. As illustrated, between 5/6 and approximately 6/1, a fast track option was not presented to customers (NFT) viewing the item's webpage. During all other relevant times, however, the fast track option was displayed during glance views (FT). From the data used to create FIG. 7, it may be determined that the conversion rate was significantly reduced during the NFT period compared to FT periods. In other words, FIG. 7 indicates that customer ordering behavior changed as a function of fast track option availability for that item such that, upon viewing the webpage for the item, customers were more likely to place an order if the fast track option was displayed. Thus, in some embodiments, the particular item corresponding to the curves shown in FIG. 7 may be identified as a candidate for predictive drop shipping.

FIG. 8 is similar to FIG. 8, but for a different item. Accordingly, graph 800 also shows the number of glance views ("gv" curve shown as solid lines) and quantities ordered ("qo" shown as dotted lines) for an item between the dates of 3/22 and 6/20. Here, however, the period of time where a fast track option was not presented to customers (NFT) was between approximately 6/17 and 6/22. In contrast with the results from graph 700, here it appears that the ratio between qo and qv remained relatively constant across the FT and NFT periods, thus indicating that the customer's instock status elasticity for this item is low. In other words, customers continued to order the item despite the lack of a fast track option presented on its webpage. In this case, the item may not be identified as a candidate for predictive drop shipping and other considerations may control whether the orders are fulfilled from inventory, via drop shipping, or by some other method.

FIG. 9 illustrates the same type of graph as FIGS. 7 and 8 but for a third item. Graph 900 illustrates two NFT periods, and it indicates that the conversion ratio actually increased during the NFT periods; which provides an inconclusive result. For example, it is possible that sales of the two NFT periods would have been even higher if the merchant had been able to provide fast track options on the item's webpage. Thus, additional data about the product may be gathered in order to determine whether the item is a candidate for predictive drop shipping at a later time. In this case, the product under consideration may be placed in a list for further analysis.

In some embodiments, in order to obtain the data used to construct the various graphs shown in FIGS. 7-9, a merchant may identify a dominant fast-track status for the relevant particular item during a particular period of time. If, for example, an item exhibits more than one in-stock status in a given day (or other suitable unit of time), some glance views occurring on that day may have displayed FT options, and others may not. To classify that time period as FT or NFT, planning system 220 may determine which status was dominant during that period. In some embodiments, if one particular status (e.g., FT or NFT) was displayed 80% of the time (or some other suitable threshold level), then the time period may be classified as having its dominant status. Otherwise, the relevant time period may be discarded during subsequent operations, for example, using a date filter or other suitable mechanism.

In some embodiments, any of the methods or techniques described above may be implemented as program instructions and data capable of being stored or conveyed via an article of manufacture including a computer-readable or -accessible medium. Such methods or techniques may include, for example and without limitation, operations of an order fulfillment system described herein, as well as the methods illustrated in FIGS. 3 and 4, and any suitable variations thereof. Such program instructions may be executed to perform a particular computational function, such as inventory health metric generation and analysis, purchase offer analysis, purchase and/or sales management, operating system functionality, applications, and/or any other suitable operations.

Figure 10:
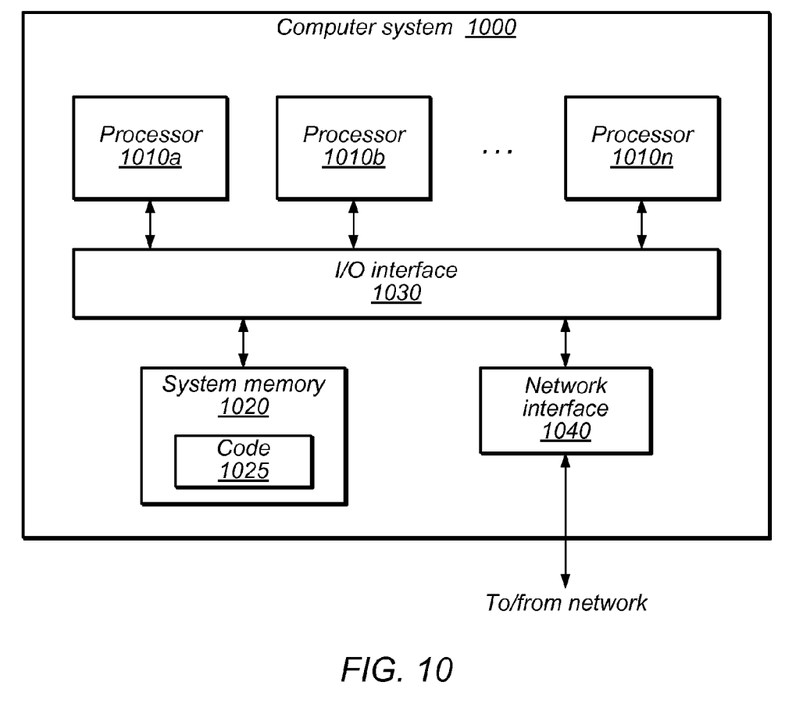
FIG. 10 is a block diagram illustrating a computer system configured to implement an order fulfillment system according to some embodiments.

An embodiment of a computer system including computer-accessible media is illustrated in FIG. 10. As illustrated, computer system 1000 includes one or more processors 1010 coupled to a system memory 1020 via an input/output (I/O) interface 1030. Computer system 1000 further includes a network interface 1040 coupled to I/O interface 1030. In some embodiments, planning system 220 may be implemented using a single instance of computer system 1000, while in other embodiments multiple such systems may be configured to host different portions or instances of a planning system. Moreover, in some embodiments, some data sources or services (e.g., purchasing management services) may be implemented via instances of computer system 1000 that are distinct from those instances implementing other data sources or services (e.g., order entry).

In various embodiments computer system 1000 may be a single system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by process 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1020 as code 1025.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media—e.g., disk or CD/DVD-ROM coupled to computer system 1000 via I/O interface 1030. A computer-accessible medium may also include any volatile or non-volatile media such as RAM (e.g., SDRAM, DDR SDRAM, RDRAM, SRAM, etc.), ROM, etc, that may be included in some embodiments of computer system 1000 as system memory 1020 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
    performing, by one or more computer systems,
        maintaining a record of an inventory of an item, wherein the item is offered for sale to customers via a web page;
        calculating a ratio between a number of views of the web page and a number of units of the item purchased over a first time period when a fast shipping or delivery option is available and over a second time period when the fast shipping or delivery option is not available, wherein the fast shipping or delivery option is not drop shipping fulfillment;
        identifying the item as a candidate for drop shipping fulfillment in response to the ratio being larger during the first time period than during the second time period;
        receiving an order for the item; and
        indicating that the received order be fulfilled with drop shipping, wherein the inventory is sufficient to fulfill the received order, and wherein a cost of fulfillment through drop shipping is higher than a cost of fulfillment from the inventory.

2. The method of claim 1, further comprising, prior to calculating the ratio, determining that the inventory is insufficient to fulfill future orders of the item based, at least in part, upon a demand forecast for the item.

3. The method of claim 1, wherein the fast shipping or delivery option includes a same-day delivery or a next-day delivery.

4. The method of claim 1, wherein identifying the item as a candidate for drop shipping fulfillment includes determining that a difference between the ratio during the first time period and the ratio during the second time period is larger than a threshold.

5. The method of claim 1, wherein the received order does not select the fast shipping or delivery option.

6. A system, comprising:
   at least one processor; and
   a memory coupled to the at least one processor, wherein the memory stores program instructions, and wherein the program instructions are executable by the at least one processor to:
   calculate a conversion rate for a product offered for sale by a merchant over a first period when a fast shipping or delivery option is available and over a second period when the fast shipping or delivery option is not available, wherein the fast shipping or delivery option is not fulfillment by a third party; and
   identify the product as a candidate for fulfillment by a third party in response to the conversion rate being larger over the first period than over the second period.

7. The system of claim 6, wherein the conversion rate is based, at least in part, upon a ratio between a number of completed purchases of the product over a number of customer views of the product.

8. The system of claim 7, wherein the number of customer views includes a number of accesses to a web page displaying the product for sale.

9. The system of claim 6, wherein the fast shipping or delivery option includes a same-day delivery or a next-day delivery.

10. The system of claim 6, wherein the program instructions are further executable by the at least one processor to:
    receive an order for the product, wherein an inventory of the merchant is sufficient to fulfill the received order; and
    cause fulfillment of the received order by the third-party.

11. The system of claim 6, wherein a cost of fulfillment by the third-party is higher than a cost of fulfillment from the inventory.

* * * * *